United States Patent [19]

Furrer et al.

[11] Patent Number: 5,042,209

[45] Date of Patent: Aug. 27, 1991

[54] PROCESS FOR CHARGING A CARRIER GAS STREAM WITH A FREE-FLOWING MATERIAL AND PROCESS FOR OPERATING THE DEVICE

[75] Inventors: Hansjörg Furrer, Ziefen; Norbert Richle, Remetschwil; Willi Heusser, Forch, all of Switzerland

[73] Assignee: Lonza Ltd., Gampel/Valais, Switzerland

[21] Appl. No.: 492,340

[22] Filed: Mar. 12, 1990

Related U.S. Application Data

[63] Continuation of Ser. No. 293,525, Jan. 5, 1989, abandoned.

[30] Foreign Application Priority Data

Jan. 19, 1988 [CH] Switzerland ............... 00177/88

[51] Int. Cl.$^5$ ................................................. B24C 3/00
[52] U.S. Cl. ........................................ 51/411; 51/416;
51/436; 406/32; 406/124
[58] Field of Search .................... 29/81 K, 81 R, 709,
29/713, 720, DIG. 34; 51/415, 416, 436, 438,
319, 320, 411; 137/624.18; 222/630; 406/12, 23,
32, 124, 127, 134

[56] References Cited

U.S. PATENT DOCUMENTS

| | | | |
|---|---|---|---|
| 679,756 | 8/1901 | Kennedy et al. | 122/395 |
| 998,762 | 7/1911 | Faller | 366/11 |
| 1,989,507 | 1/1935 | Diescher | |
| 2,176,879 | 10/1939 | Bartell | |

(List continued on next page.)

FOREIGN PATENT DOCUMENTS

| | | |
|---|---|---|
| 295268 | 3/1969 | Australia . |
| 0133937 | 3/1985 | European Pat. Off. . |
| 0169413 | 10/1985 | European Pat. Off. . |
| 0164637 | 12/1985 | European Pat. Off. . |

(List continued on next page.)

OTHER PUBLICATIONS

Chem. Abs., 102:175011F, Alkaline Battery.
Brochure, Ritzharteprufer Nach Sikkens, Typ 601, ISO 1518, BS 3900:E2, NEN 5336.
Boundy and Boyer, "Styrene, Its Copolymers and Derivatives," Am. Chem. Soc. Monograph Series, 1952, pp. 859–860.

Primary Examiner—Mark Rosenbaum
Assistant Examiner—Frances Chin
Attorney, Agent, or Firm—Fisher, Christen & Sabol

[57] ABSTRACT

The device has a storage vessel (2) that is connected to a compressed gas pipe (1) and whose outlet (6) discharges through a shut-off element (7) into a carrier gas pipe (10). Shut-off element (7) and the setpoint values of a first pressure regulator (23) in compressed gas pipe (1), as well as a second pressure regulator (24) in carrier gas pipe (10), are controlled by a program control device (33) with a program memory (34), in which several programs that are selectable by a selector (37) for charging the carrier gas stream with varying amounts of material and/or material concentrations are stored. Each program contains time-driven switching commands for opening and closing shut-off element (7) and two different setpoint values for first and second pressure regulator (23, 24). With the device, the carrier gas stream, for example, for descaling hollow billets of varying dimensions, can be charged selectively with different, precisely measured amounts of material and material concentrations (amounts of material per carrier gas volume), by which charging with different amounts of material or material concentrations can be done in quick succession.

7 Claims, 3 Drawing Sheets

U.S. PATENT DOCUMENTS

| | | | |
|---|---|---|---|
| 2,316,571 | 4/1943 | Dunmire et al. | 80/1 |
| 2,588,625 | 3/1952 | Ferner et al. | |
| 2,719,386 | 10/1955 | Johnson et al. | |
| 2,735,814 | 2/1956 | Hodson, Sr. et al. | |
| 3,198,735 | 8/1965 | Lamson et al. | |
| 3,213,024 | 10/1965 | Blake | |
| 3,242,075 | 3/1966 | Hunter | |
| 3,341,454 | 9/1967 | Chor, Jr. et al. | |
| 3,344,065 | 9/1967 | Gansheimer et al. | |
| 3,384,581 | 5/1968 | Peace | |
| 3,472,770 | 10/1969 | Preston et al. | |
| 3,525,692 | 8/1970 | Dodson et al. | |
| 3,549,206 | 12/1970 | Reuter | 406/134 X |
| 3,577,754 | 5/1971 | Calmes | |
| 3,698,953 | 10/1972 | Eisenberg | |
| 3,770,634 | 11/1973 | Dodson et al. | |
| 3,801,504 | 4/1974 | Stone | |
| 3,833,502 | 9/1974 | Leary et al. | |
| 3,838,048 | 9/1974 | Hedge | |
| 3,908,038 | 9/1975 | Nienart et al. | |
| 3,918,284 | 11/1975 | Reiley et al. | |
| 3,983,042 | 9/1976 | Jain et al. | |
| 4,039,337 | 8/1977 | Brown et al. | |
| 4,050,932 | 9/1977 | Lemmer | |
| 4,052,323 | 10/1977 | Feneberger et al. | |
| 4,055,025 | 10/1977 | Seese et al. | 51/411 |
| 4,055,503 | 10/1977 | Anselment et al. | |
| 4,090,666 | 5/1978 | Peck | 239/15 |
| 4,104,178 | 8/1978 | Jain et al. | |
| 4,115,283 | 9/1978 | Needham | |
| 4,140,834 | 2/1979 | Marcantonio et al. | |
| 4,206,060 | 6/1980 | Yamamoto et al. | |
| 4,206,061 | 6/1980 | Dodson et al. | |
| 4,228,020 | 10/1980 | Papay | |
| 4,297,231 | 10/1981 | Kahara et al. | |
| 4,314,907 | 2/1982 | Defretin et al. | |
| 4,321,295 | 3/1982 | Smith-Johannsen | |
| 4,333,275 | 6/1982 | Bernot | 51/320 |
| 4,339,897 | 7/1982 | Thompson et al. | 51/436 |
| 4,351,815 | 9/1982 | Glasstetter et al. | |
| 4,357,249 | 11/1982 | Mellor | |
| 4,357,953 | 11/1982 | Patterson | 137/624.18 X |
| 4,452,169 | 1/1984 | Matsuda | 118/50 |
| 4,454,173 | 6/1984 | Koga | 427/235 |
| 4,456,539 | 6/1984 | Shim | |
| 4,470,939 | 9/1984 | Schoolcraft | |
| 4,482,275 | 11/1984 | Shinozaki et al. | 406/12 |
| 4,490,077 | 12/1984 | Shimada et al. | 406/124 X |
| 4,535,812 | 8/1985 | Miller | 137/624.18 X |
| 4,575,430 | 3/1986 | Periard et al. | |
| 4,622,709 | 11/1986 | Matsuda | 15/4 |
| 4,656,105 | 4/1987 | Kobayashi et al. | |
| 4,668,534 | 5/1987 | Gray | 427/183 |
| 4,687,598 | 8/1987 | Varma | |
| 4,702,860 | 10/1987 | Kinderov et al. | |
| 4,710,307 | 12/1987 | Périard et al. | 252/11 X |
| 4,735,734 | 4/1988 | Staub et al. | 252/29 |
| 4,790,263 | 12/1988 | Eckert et al. | 118/317 |
| 4,819,471 | 4/1989 | Cook | |
| 4,862,838 | 9/1989 | Hodgkins et al. | 123/41.35 |

FOREIGN PATENT DOCUMENTS

| | | |
|---|---|---|
| 0250881 | 5/1987 | European Pat. Off. |
| 2104041 | 8/1971 | Fed. Rep. of Germany |
| 2430249 | 6/1974 | Fed. Rep. of Germany |
| 2450716 | 11/1975 | Fed. Rep. of Germany |
| 2921620 | 12/1979 | Fed. Rep. of Germany |
| 3429524 | 2/1986 | Fed. Rep. of Germany |
| 55-103203 | 8/1980 | Japan |
| 56-139212 | 10/1981 | Japan |
| 56-145503 | 11/1981 | Japan |
| 58-48361 | 3/1983 | Japan |
| 58-167018 | 10/1983 | Japan |
| 59-18799 | 1/1984 | Japan |
| 59-224054 | 12/1984 | Japan |
| 596294 | 3/1978 | Switzerland |
| 609728 | 3/1979 | Switzerland |
| 981351 | 12/1982 | U.S.S.R. |
| 1030405 | 7/1983 | U.S.S.R. |
| 2036071 | 6/1980 | United Kingdom |

PROCESS FOR CHARGING A CARRIER GAS STREAM WITH A FREE-FLOWING MATERIAL AND PROCESS FOR OPERATING THE DEVICE

This application is a continuation of U.S. application Ser. No. 293,525, filed on Jan. 5, 1989, now abandoned.

BACKGROUND OF THE INVENTION

1. Field of the Invention

The invention relates to a device for charging a carrier gas stream with a free-flowing material and to a process for operating the device.

2. Background Art

Devices of this kind are used for example for descaling the inner surface of red-hot hollow billets in the production of seamless pipes. They are used to charge a carrier gas stream with powdery descaling agents which then is conveyed through the red-hot hollow billet. But the devices can also be used for other applications and with charges of a carrier gas stream with other free-flowing materials, especially other powdery or granular or particulate materials.

BROAD DESCRIPTION OF THE INVENTION

The objects of the invention are to charge a carrier gas stream selectively with different, exactly measured amounts of material and/or material concentrations (amounts of material per carrier gas volume) and to make charging with varying amounts of material or material concentrations possible in quick succession.

These objects of the invention are achieved by the device and process of the invention.

The invention involves a device for charging a carrier gas stream with a free-flowing material. In the device there is, connected to a compressed gas pipe, a storage vessel for the material with a material inlet that can be closed pressure-tight and a material outlet that discharges into a carrier gas pipe and that can be shut off with a shut-off element. There is also a program control device that controls the shut-off element and the setpoint values of a first pressure regulator in the compressed gas pipe as well as a second pressure regulator in a carrier gas pipe. A program control device has a program memory in which several programs for charging the carrier gas stream with various amounts of materials and/or material concentrations are stored. There is a selector for program selection. Each program exhibits time-drive ($t_{x1}$, $t_{x2}$) switching commands for opening and closing the shut-off element and two different setpoint values ($p_{x1}$, $p_{x1}$) for the first and second pressure regulators.

The invention also involves a process for operating the invention device.

The time-driven switching commands for opening and closing the shut-off element and both different setpoint values for the first and second pressure regulators of each program determine the amount of material and the material concentration. The material concentration is determined essentially by the difference between the two setpoint values. The amount of materials is also determined by the difference of the setpoint values and additionally by the opening time of the shut-off element, and it does not increase in proportion to the opening time. A change in the amount of material can be reached more precisely by changing the set point value difference (and thus the concentration) than by changing the opening time.

The advantages of the invention are to be seen for example in using the device for descaling hollow billets in that the descaling agent for each hollow billet dimension can be applied in precisely the required total amount and concentration, i.e., exactly in the amount required per unit area, so that a perfect descaling with homogenous distribution of the agent over the hollow billet surface and the smallest possible consumption of agent is achieved. And in that hollow billets with varying dimensions (diameter and/or length) can be descaled quickly, consecutively with suitably changed amounts and/or concentrations of the descaling agent in that for each hollow billet size, a suitable program is stored in the program memory and can be called up in each case by the selector.

Preferably a second shut-off element, placed in the flow direction in front of the discharge point of the material outlet into the carrier gas pipe, is controlled by the control device and each program exhibits time-driven ($t_{x1}$, $t_{x2}$, $t_{x3}$) switching commands for opening and closing both of the shut-off elements. The preferred invention process version is for operating such preferred device, wherein the second shut-off element is opened for a first, predetermined period ($t_{x1}$) before the first shut-off element and is closed for a second predetermined period ($t_{x3}$) after the first shut-off element.

Also preferably there is a refill funnel in contact with the material inlet by a third shut-off element controlled by the control device, a fourth shut-off element controlled by the control device, a fourth shut-off element in the compressed gas pipe controlled by the control device, an air release element controlled by the control device for the venting vessel and a level detector, that is placed in the lower part of the vessel, is connected to the control device and indicates reaching or falling short of a minimal level ($f_{min}$). Preferably a refill program is stored in the program memory by which the control device, with a level detector indicating the reaching or falling short of the minimal level ($f_{min}$) in each case after the close command for the first shut-off element, gives a close command to the fourth shut-off element and open commands to the air release element as well as to the third shut-off element and, after a preselected period ($t_{x4}$), close commands to the third shut-off element and the air release element as well as an open command to the fourth shut-off element.

Preferably there is a second level detector that is placed in the upper part of the vessel and forms a connection with the control device and that indicates reaching or exceeding a maximum level ($f_{max}$). Preferably the control device, when executing the refill program, gives a close command to the third shut-off element as soon as the second level sector signals reaching or exceeding the maximum level ($f_{max}$).

Preferably there is one vibrator or one vibrator each placed on the lower part of the vessel and/or the refill funnel.

Preferably, for charging a carrier gas stream with a powdery descaling agent and for applying the descaling agent to the inner surface of a pipe or a hollow billet, there is a discharge device with a gate element connected to the outlet of the carrier gas pipe and a swirl generator connected to the branch pipe branched off from the carrier gas pipe in the flow direction in front of the discharge point of the material outlet.

Further preferably there is a shut-off element, controlled by the control device, in the branch pipe.

From the beginning of the discharging of the descaling agent, the carrier gas charged with the descaling agent does not enter axially, but spiral-like into the pipe or hollow billet and thereby the descaling agent is deposited homogeneously around the inner surface of the pipe or hollow billet and a near perfect descaling is achieved with very little or no descaling agent being wasted. If the descaling agent was introduced axially, a non-homogeneous deposit would result and, hence, an insufficient descaling would result with a waste of the descaling agent.

BRIEF DESCRIPTION OF THE DRAWINGS

In the following part of this specification, one embodiment of the invention is described in more detail based on the drawings.

In the drawings.

DETAILED DESCRIPTION OF THE INVENTION

Figure 1:
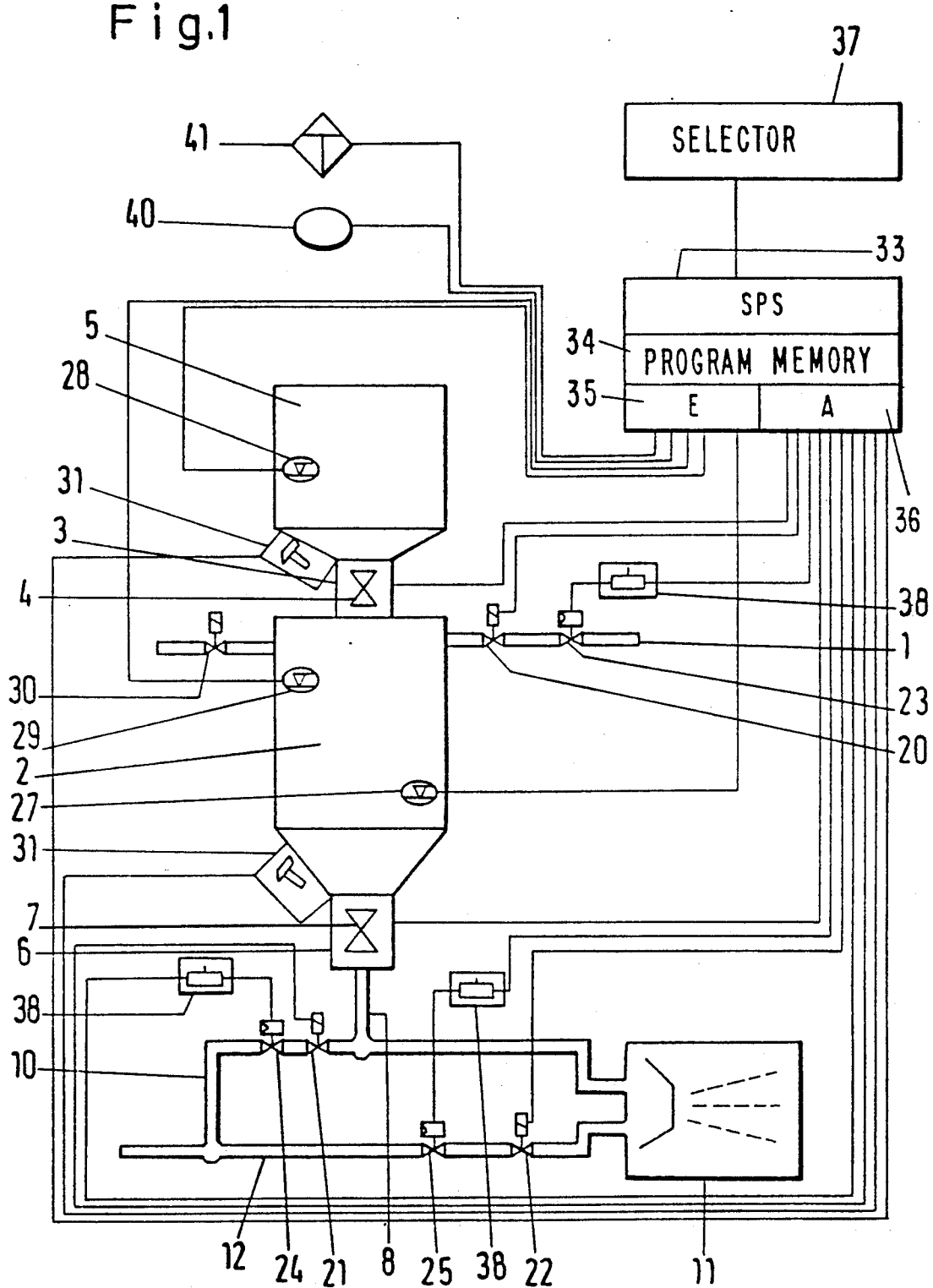
FIG. 1 is a diagrammatic representation of a device according to the invention.
Figure 2:
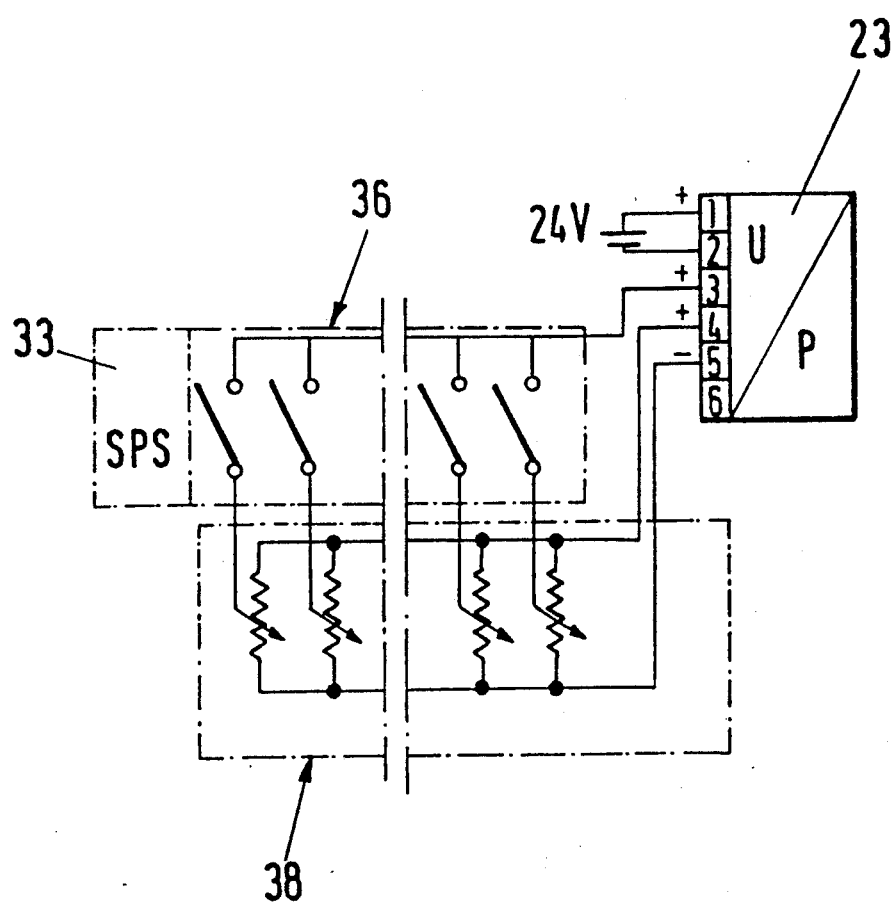
FIG. 2 is schematic of the potentiometer control of the pressure regulator of the invention device of FIG. 1.
Figure 3:
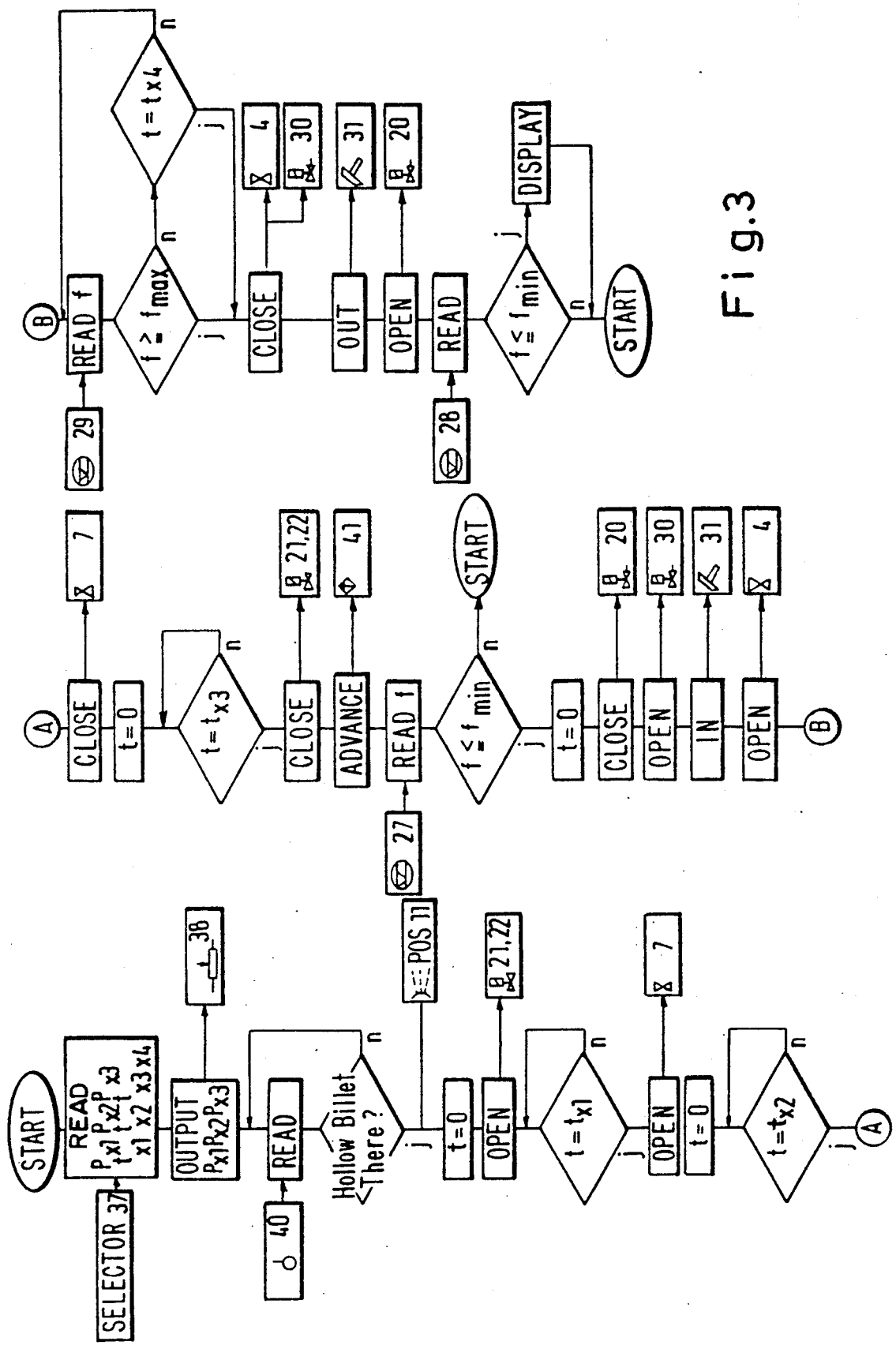
FIG. 3 is a flowchart of the main program that can be modified by a selector and the refill subprogram of the control device of the invention device of FIG. 1.

The invention device represented in FIGS. 1 to 3 acts to charge a carrier gas stream with selectable amounts and concentrations of a powdery descaling or caustic agent, for example, a caustic agent of the kind described in European Published Patent Application No. 169,413, which is applied to the inner surface of hollow billets by the carrier gas stream.

The device has storage vessel 2 connected to compressed gas pipe 1 for the descaling agent and storage vessel 2 is large enough that it can hold a sufficient amount of the agent for descaling a multiplicity of hollow billets, e.g., 20 to 30. Material inlet 3 placed above on vessel 2 is connected by shut-off element 4 to refill funnel 5 placed above shut-off element 4. Material outlet 6 placed below on vessel 2 can be shut off by shut-off element 7 and connected to connecting piece 8 of carrier gas pipe 10. Compressed gas pipe 1 and carrier gas pipe 10 can be fed with compressed air, e.g., from a compressed air network or a compressor, or with inert gas, e.g., nitrogen.

The section of carrier gas pipe 10 behind connecting piece 8 in the flow direction, through which the carrier gas charged with the material flows, is connected to a gate element of discharge device 11. Discharge device 11 (not shown in more detail) is designed, for example, according to the device with a swirl generator (not represented) described in European Published Patent Application No. 250,881. The swirl generator is connected to branch pipe 12 of the carrier gas pipe that is branched off in the flow direction in front of connecting piece 8 of carrier gas pipe 10.

In compressed gas pipe 1, in the feed section of carrier gas pipe 10 in front of connecting piece 8 in the flow direction and in branch pipe 12, there is placed in each case an electronically controllable shut-off element 20, 21, 22 and a pressure regulator 23, 24, 25 with controllable setpoint value. Suitable, for example, as pressure regulators 23, 24, 25, is the pressure regulator valve XRE of the Hoerbiger firm that regulates the pressure as a function of an electrical voltage or resistance.

In the lower part of vessel 2 and of refill funnel 5, there is placed in each case a level detector 27, 28 which detects the reaching or falling short of minimal level. For detecting reaching or exceeding a maximum level, another level detector 29 is placed in the upper part of vessel 2. (Suitably, an additional level detector can be placed in the upper part of the refill funnel.) The venting of vessel 2 necessary for refilling is performed by air release valve 30. On the lower part of vessel 2 and of refill funnel 5, there is further placed in each case a vibrator 31, which ensures that the material moves evenly distributed.

Shut-off elements 4, 7, 20 to 22, pressure regulators 23 to 25, air release valve 30 and vibrators 31 are controlled by program control device 33 with a program memory 34 and a clock, whose inputs and outputs are designated by 35 and 36. A so-called stored programmable controller (SPS) of the MELSEC F2-60 M type with 1000 words RAM/EPROM from the Mitsubishi Electric firm is involved.

In program memory 34 there are stored several programs for charging the carrier gas stream with varying amounts of material ; and material concentrations that are each assigned to a certain hollow billet size. The different programs can each be stored as complete programs in program memory 34 or a common main program (as explained below in detail) with several different data records that can be stored, and each of the different data records constitutes a program modification of the main program. The program selection or the selection of the program modification is performed by selector 37.

Each program or each program modification has (as described below in more detail) time-driven, switching commands for openings and closing shut-off elements 4, 7, 20 to 23, 30 and a setpoint value $p_{x1}$, $p_{x2}$, $p_{x3}$ for pressure regulators 23 to 25 in each case. Decisive for the amount of material and the material concentration is the difference in setpoint values $p_{x1}$ and $p_{x2}$ for pressure regulators 23 and 24 and opening time $t_{x2}$ of shut-off element 7 determined by the time-driven switching commands. The material concentration is additionally also dependent on setpoint value $p_{x3}$ of pressure regulator 25, which regulates the flow of the gas flowing additionally through branch pipe 12 into discharge device 11. (The larger $p_{x3}$ is, the smaller the concentration.)

Setpoint values $P_{x1}$, $P_{x2}$, $P_{x3}$ of pressure regulators 23 to 25 are controlled by program control device 33 in each case by a potentiometer control 38, represented diagrammatically in FIG. 2. The program sequence is triggered by infrared detector 40 that reacts when the (next) red-hot hollow billet has reached the descaled position. The further conveyance of the descaled hollow billet triggered by a command transmitter 41 connected to output 35 of control device 33.

The program sequence will be explained in the following based upon the example of the flowchart represented in FIG. 3. Stored in program memory 34 is the program represented in the flowchart and a data record for each hollow billet size with four time values $t_{x1}$, $t_{x2}$, $t_{x3}$, $t_{x4}$ and three pressure setpoint values $P_{x1}$, $P_{x2}$, $P_{x3}$, where x is the selection number of the data record assigned to the hollow billet size.

Time value $t_{x1}$ and pressure setpoint value $P_{x3}$ are selected to be large enough that a spiral-shaped movement of the carrier gas flowing out of discharge device 11 can develop before charging the carrier gas stream with the material, as described below. Time value $t_{x1}$ can also be longer, in case loose scale is to be blown out of the hollow billet. Time value $t_{x2}$ and pressure setpoint values $p_{x1}$, $p_{x2}$ are selected according to the desired amount of material and material concentration. Time value $t_{x3}$ is selected so that the material in carrier gas pipe 10 after closing shut-off element 7 is still blown out completely or almost completely. Time value $t_{x4}$ limits the refilling time and is measured according to the conveying pace of the hollow billet to be short enough so that refilling in the time between carrying away the descaled hollow billet and feeding the next hollow billet to be descaled occurs without waiting times appearing.

In the following Table 1, examples of three data records for different hollow billet sizes are given, based on a diameter of carrier gas pipe 10 of 25 mm and a length of the section between connecting piece 8 and discharge device 11 of 10 m:

TABLE 1

| x = 1 | x = 2 | x = 3 |
|---|---|---|
| $t_{11}$ = 1.0 s | $t_{21}$ = 1.5 s | $t_{31}$ = 2.0 s |
| $t_{12}$ = 1.0 s | $t_{22}$ = 1.0 s | $t_{32}$ = 1.5 s |
| $t_{13}$ = 0.5 s | $t_{23}$ = 1.0 s | $t_{33}$ = 2.0 s |
| $t_{14}$ = 2.5 s | $t_{24}$ = 2.5 s | $t_{34}$ = 2.5 s |
| $p_{11}$ = 1.0 bar | $p_{21}$ = 1.3 bar | $p_{31}$ = 1.7 bar |
| $p_{12}$ = 4.0 bar | $p_{22}$ = 4.5 bar | $p_{32}$ = 5.0 bar |
| $p_{13}$ = 1.0 bar | $p_{23}$ = 2.0 bar | $p_{33}$ = 2.5 bar |

The assigned hollow billet sizes and the amount of the material discharged in each case with the program described below are:

TABLE 2

| for | x = 1 | x = 2 | x = 3 |
|---|---|---|---|
| hollow billet diameter | 15.2 cm | 20.6 cm | 24.8 cm |
| hollow billet length | 900 cm | 1000 cm | 1100 cm |
| amount of material | 215 g | 315 g | 430 g |

At the program start, the data record $t_{x1}$, $t_{x2}$, $t_{x3}$, $t_{x4}$, $p_{x1}$, $p_{x2}$, $p_{x4}$, assigned to selector position x, is read. The pressure setpoint values of the three pressure regulators 23, 24, 25 are set by potentiometer controls 38 to values $p_{x1}$, $p_{x2}$, $p_{x3}$. IR detector 40 is interrogated and as soon as it signals the presence of a red-hot hollow billet, a command for positioning discharge device 11 is given. Next, the clock time is set to 0 and, simultaneously, open commands are given to shut-off elements 21, 22.

The carrier gas flows now through pipe 10 and discharge device 11 and simultaneously gas flows through branch pipe 12, by which a spiral-shaped movement of the carrier gas flowing out of discharge device 11 develops. After expiration of time $t_{x1}$, an open command is given to shut-off element 7 and the clock time is set back to 0. The material is now driven into carrier gas pipe 10 by the compressed gas from pipe 1 and in doing so the carrier gas is charged with material. (Shut-off element 20 is opened.) After expiration of time $t_{x2}$, a close command is given to shut-off element 7 and the time is again set back to 0. The material inflow into carrier gas pipe 10 is thus interrupted, but the carrier gas flows further and drives the material still in pipe 10. As soon as time $t_{x3}$ is expired, close commands are given to shut-off elements 21 and 22, by which the carrier gas stream is interrupted. At the same time, an advance command is given to command transmitter 41, which triggers the further conveyance of the descaled hollow billet and the feeding of the next hollow billet to be descaled. Then level detector 27 is interrogated. If minimal level $f_{min}$ in vessel 2 has not fallen short, the program returns to the beginning.

If minimal level $f_{min}$ is not reached, the refill subprogram described below starts. The time is set back to 0 and a close command is given to shut-off element 20, open commands to air release valve 30 and shut-off element 4, as well as a start command to vibrators 31. The material in refill funnel 5 no moves into vessel 2. In each case then level detector 29 is interrogated and when it indicates reaching or exceeding maximum level $f_{max}$ of vessel 2 or when time $t_{x4}$ has expired, close commands are given to shut-off elements 4 and 30, an open command is given to shut-off element 20 and an off command is given to vibrators 31. This finishes the refill operation, and vessel 2, now again closed pressure-tight, is again placed under pressure $P_{x1}$ by open shut-off element 20. Level detector 28 is interrogated and, if the level falls short of minimal level $f_{min}$ of refill funnel 5, a display is turned on that displays the required refilling of funnel 5 or automatically triggers it, upon which the program goes to the beginning.

If the next hollow billet has other dimensions, in the course of the program being run, the selector position x of selector 37 is still suitably changed by an operator so that when the program starts the data record $t_{x1}$, $t_{x2}$, $t_{x3}$, $t_{x4}$, $P_{x1}$, $P_{x2}$, $P_{x3}$, assigned to new selector position x, is read in for the other hollow billet dimensions and the program runs modified accordingly. Instead of or in addition to manually adjusting selector 37 for selecting the program, an automatic selector can be provided which, by suitable measuring elements, determines the dimensions (diameter and length) of the next hollow billet to be descaled in each case and selects the program assigned to these dimensions.

The opening and closing of shut-off element 22 is performed in the example at the same time as that of shut-off element 21, so that the gas is fed to the swirl generator and the gate element of discharge device 11 simultaneously. But the program can also be configured so that a time difference that can be selected with the selector occurs between the opening or closing of shut-off elements 21 and 22.

Suitably, acoustic and optical fault alarms (not represented) are provided that are triggered by control device 33 when a pressure sensor (not represented) inside of the vessel 2 indicates an overpressure or when level detector 27, after the refilling, indicates a falling short of the minimal level in vessel 2.

What is claimed is:

1. A device for selectively dispensing varying amounts of powdery descaling agent and varying agent concentrations by charging a carrier gas stream with the agent and for applying the descaling agent to inner surfaces of at least one hollow entity consisting of a member selected from the group consisting of pipes and hollow billets, of different dimensions, comprising:

a storage vessel for the descaling agent, said storage vessel having a descaling agent inlet that can be closed pressure-tight and a descaling agent outlet, a discharge device for discharging the descaling agent to the inner surface of the at least one hollow entity, to be descaled, a first gas pipe fed with compressed gas connected to said storage vessel, for feeding compressed gas into said storage vessel, a second gas pipe, fed with compressed gas and connected to said discharge device, for feeding carrier gas carrying the descaling agent to the discharge device, said descaling agent outlet being connected to said second gas pipe for charging the carrier gas with descaling agent from the storage vessel, a third gas pipe fed with compressed gas and connected to said discharge device for creating a swirl gas flow in said discharge device, a first shut-off element for shutting-off said descaling agent outlet, a second shut-off element in said second gas pipe for shutting off the carrier gas flow, a third shut-off element in said third gas pipe, a first pressure regulator in said first gas pipe having a controllable setpoint value ($p_{x1}$), termed said first setpoint value, a second pressure regulator in said second gas pipe having a controllable setpoint value ($p_{x2}$), termed said second setpoint value, a program device, said program control device controlling said first and said second shut-off elements and said first and second setpoint values ($p_{x1}$, $p_{x2}$) of said first and said second pressure regulators, respectively, and having a program memory, in which a plurality of programs assigned to hollow entities of different dimensions are stored for charging the carrier gas stream with various amounts of descaling agent and descaling agent concentrations and for timing of the carrier gas flow, the swirl gas flow and the charging of the carrier gas with the descaling agent, a program selector for the selection of said programs, each of said programs including said first and second setpoint values ($p_{x1}$, $p_{x2}$) for said first and said second pressure regulators, respectively, and three time values for subsequently giving a first open command for opening said second shut-off element, a first time period ($t_{x1}$) after said first open command, a second open command for opening said first shut-off element, a second time period ($t_{x2}$) after said second open command, a first close command for closing said first shut-off element, and a third time period ($t_{x3}$) after said first close command for closing said second shut-off element, said program control device further controlling said third shut-off element in such a way that the third shut-off element is opened for a time period before the first shut-off element is opened, said time period being sufficiently long so that a spiral-shaped movement of the gas flowing out of the discharge device can develop before the gas is charged with the descaling agent.

2. Device according to claim 1 wherein there is a refill funnel in contact with the descaling agent inlet by the third shut-off element controlled by the control device, a fourth shut-off element in a compressed gas pipe controlled by the control device, an air release element controlled by the control device for venting the storage vessel and a level detector that is placed in the lower part of the storage vessel, is connected to the control device and indicates reaching or falling short of a minimal level ($f_{min}$), a refill program is stored in the program memory by which the control device, with the level detector indicating reaching or falling short of the minimal level ($f_{min}$) in each case after the close command for the first shut-off element, gives a close command to the fourth shut-off element and open commands to the air release element as well as to the third shut-off element and, after a preselected period ($t_{x4}$), close commands to the third shut-off element and the air release element as well as an open command to the fourth shut-off element.

3. Device according to claim 2 wherein there is a second level detector that is placed in the upper part of the storage vessel and forms a connection with the control device and that indicates reaching or exceeding a maximum level ($f_{max}$), and the control device, when executing the refill program, gives a close command to the third shut-off element as soon as the second level detector signals reaching or exceeding the maximum level ($f_{max}$).

4. Device according to claim 3 wherein a vibrator is placed on the lower part of the vessel.

5. Device according to claim 3 wherein a vibrator is placed on the lower part of the refill funnel.

6. Device according to claim 3 wherein a vibrator is placed on the lower part of each of the vessel and the vibrator.

7. An apparatus for dispensing a free-flowing material by charging a carrier gas stream, comprising:

a closed vessel for containing the material, said vessel having a material inlet and outlet that can be sealed pressure tight;

a compressed gas pipe connected to a compressed gas supply and to said closed vessel;

a first carrier gas pipe connected to a carrier gas supply and to said outlet of said vessel;

a second carrier gas pipe connected to a carrier gas supply;

a swirl generator connected to discharge ends of said first and second carrier gas pipes, said carrier gas stream being discharged from the swirl generator;

a first control valve positioned in said compressed gas pipe;

a second control valve positioned in said first carrier gas pipe;

a third control valve positioned in said second carrier gas pipe;

a first pressure regulator in said compressed gas pipe;

a second pressure regulator in said first carrier gas pipe;

a third pressure regulator in said second carrier gas pipe; and selectable control means for controlling said first, second and third control valves and said first, second and third pressure regulators for selectably operating the apparatus as to an amount and a concentration of material in said carrier gas stream being discharge from the swirl generator and uniformly applying the material to an object.

* * * * *